United States Patent
Bentzien

[15] 3,637,082
[45] Jan. 25, 1972

[54] PLATE SHIFTER AND SCRAPER ASSEMBLY FOR FILTER PRESSES

[72] Inventor: Leonard T. Bentzien, Menomonee Falls, Wis.

[73] Assignee: T. Shriver & Company, Inc., Harrison, N.J.

[22] Filed: June 20, 1969

[21] Appl. No.: 834,948

[52] U.S. Cl. ........................................................210/225
[51] Int. Cl. .......................................................B01d 25/32
[58] Field of Search..............210/225, 228, 230, 231, 236, 210/237, 238, 413; 100/198, 218

[56] References Cited

UNITED STATES PATENTS

| | | | |
|---|---|---|---|
| 1,959,491 | 5/1934 | Moran | 210/413 |
| 3,446,358 | 5/1969 | Kratochvil et al. | 210/236 X |
| 3,486,624 | 12/1969 | Sykes | 210/230 X |

*Primary Examiner*—Reuben Friedman
*Assistant Examiner*—T. A. Granger
*Attorney*—Curtis, Morris & Safford

[57] ABSTRACT

A system for mechanically shifting and cleaning the filter plates in a pressure-type filter press wherein the filter plates, which are supported on the side rails of the filter press and have supporting brackets extending over each of the rails, are shifted apart to allow a plate scraping mechanism to move downwardly against the plates and scrape the accumulated filter cake from the filter plates. The plate shifter and scraper are mounted on a carriage which slides along the rails of the filter press and the plate shifter includes pneumatically operated plate shifting devices to separate the filter plates. Once the plates are separated, a scraper mounted on the carriage in pendulum fashion above the plates is extended between the separated plates to scrape the accumulated filter cake from the exposed faces of the filter plates.

11 Claims, 4 Drawing Figures

INVENTOR.
Leonard T. Bentzien
BY
Curtis, Morris & Safford
ATTORNEYS

PLATE SHIFTER AND SCRAPER ASSEMBLY FOR FILTER PRESSES

This invention relates to filter presses and more in particular to shifting and cleaning of the filter plates in a pressure-type filter press to remove the accumulated filter cake.

Pressure-type filter presses, for example, of the plate and frame type, find a wide application in industrial usage to separate solid particulates from a liquid slurry. In these pressure-type filters, liquid slurry under pressure is forced through filter elements in each of a number of filter plates to separate the particulate solids out of the liquid. The separated solids form a cake on the filter elements in each of the plates which must be periodically removed. One of the main disadvantages of conventional pressure-type filters is the fact that operation is necessarily intermittent to allow the plates to be individually separated and the cake thereon scraped off. Heretofore, this operation has been done by hand or by automatic plate shifter mechanisms which must be built into the filter press and, hence, are complex.

Low-overall efficiency and high-labor costs are characteristic of conventional plate and frame filter presses which must be cleaned by manual operations thus needlessly adding to manufacturing costs; and automatic plate shifters to replace manual plate shifting and cake scraping have been needlessly complex, required extensive modifications of conventional filter press structures and in general have not been completely satisfactory.

Accordingly, an object of the present invention is to provide improved means for removing the accumulated cake from the filter plates of pressure-type filter presses. It is a further object of the present invention to provide an automatic plate shifting mechanism in combination with filter cake scraping means such that the individual filter plates of a pressure-type filter press can be serially shifted and the filter cake accumulated thereon scraped off. It is a still further object of the present invention to provide an automatic filter plate shifter which overcomes the aforementioned difficulties by a relatively simple and sturdy type of mechanism to shift the plates in a filter press thereby to expose both sides of each plate so that the filter cake thereon can be scraped off. Another object of the present invention is to provide a mechanism of the character described which is readily adaptable to conventional filter presses without requiring extensive modification to the basic filter press structure.

In accordance with a preferred embodiment of the present invention, a movable carriage is adapted to ride on the rails of a pressure-type filter press frame. A plate shifter including two plate shifting mechanisms which are operative to engage extending brackets on adjacent filter plates moves the plates apart by shifting the plates along the side rails of the filter press. A scraper assembly mounted in pendulum fashion above the plates at the center of the carriage has a scraper which may be moved and extended between the separated plates so as to come into contact with the face of the plates and move downwardly along the filter plate so as to scrape the accumulated filter cake from the filter plates.

Figure 1:
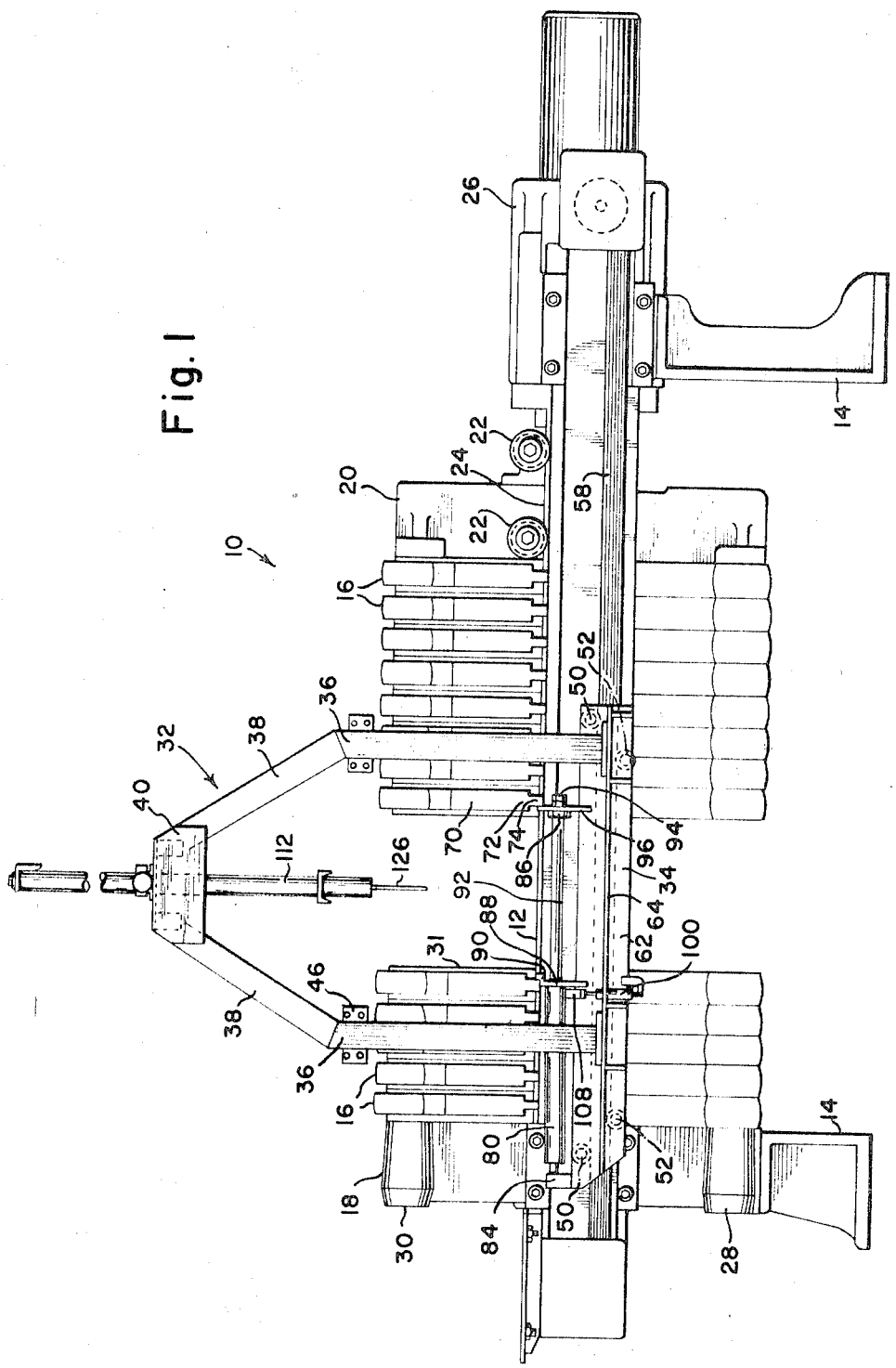
FIG. 1 is a side elevational view of a filter press showing the automatic plate shifter and scraper mounted thereon.

With reference to the drawing and particularly FIG. 1, there is shown a filter press 10 comprising a pair of spaced side rails 12 supported on pedestal supports 14 and including a plurality of filter frame members 16 slidably supported on the rails 12. A stationary head 18 is mounted at one end of the frame and a follower or movable head 20 is mounted at the other end of the frame with the filter plates 16 positioned therebetween.

The follower 20 includes rotatably mounted carriage wheels 22 thereon which are positioned to ride along the top 24 of the side rails 12 and a closing device 26, which may be a mechanical jack or a hydraulic ram, is associated with the follower 20 to move the follower toward the stationary head 18 and press the included filter plates 16 tightly together. Suitable gasketing is provided between each of the filter plates 16, the stationary head 18 and the follower 20 such that when the plates are pressed tightly together and liquid with suspended solids is forced into the filter press, no liquid escapes from the filter press around the periphery of the plates.

As is conventional with pressure-type presses, a slurry inlet 28 and a clear filtrate outlet 30 is provided in stationary head 18 and both the inlet and outlet are in fluid communication with each of the filter plates. Hence, in operation, the plates are pressed tightly together by the closing device, liquid slurry under pressure is forced into the press through inlet 28 and flows into each of the chambers formed by adjacent filter plates 16. Since the slurry is under pressure, the liquid slurry is forced through the filter elements 31 in each plate 16 and, as it passes through the filter elements associated with each filter plate, a filter cake is deposited on the filter elements and the clear liquid filtrate is forced out of the clear filtrate outlet 30. Periodically, then, it is necessary to separate the plates and remove the accumulated filter cake thereon.

Figure 2:
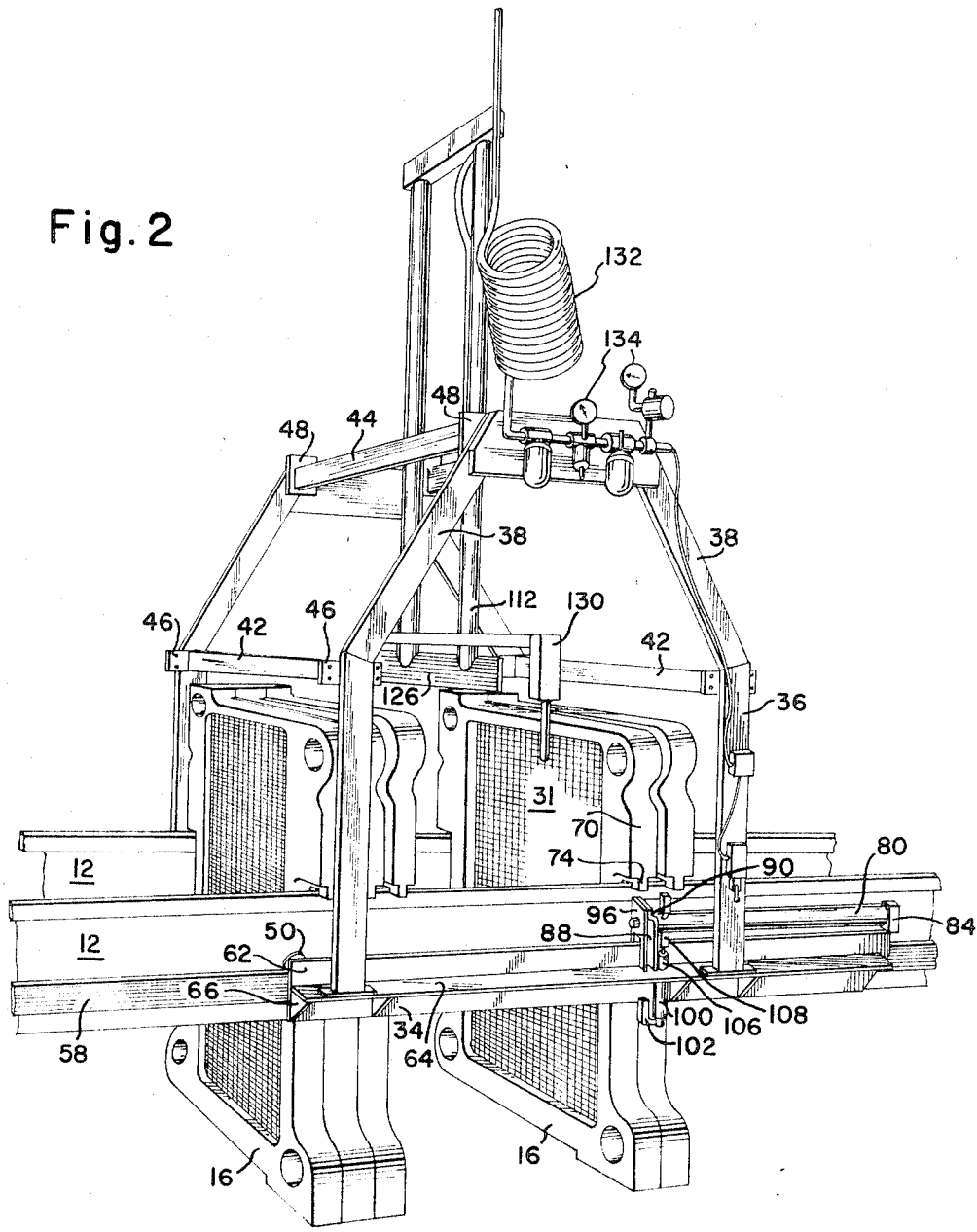
FIG. 2 is a perspective view on an enlarged scale showing the position of the plate shifter and scraper relative to the plates of a filer press.

To this end, a combined plate shifter and plate scraper is provided which is operable to shift individual plates along the rails 12 of the filter press and scrape the cake from the face of each of the filter members. The plate shifter assembly (see FIG. 2 as well) is mounted on the side rails 12 for slidable disposition therealong and includes a carriage assembly 32 comprising a base support 34 to which is secured vertically upstanding frame members 36 terminating in inclined upper frame members 38. The upper frame members 38 are interconnected by opposed plate members 40. Cross brace members 42 and 44, respectively, tie the upper ends of the plate shifter and scraper carriage assembly together. Flanged couplings 46 associated with cross brace members 42 and flanged couplings 48 associated with cross brace members 44 allow the carriage assembly 32 to be accommodated to filter presses of varying widths by permitting longer or shorter cross brace members to be used.

Figure 3:
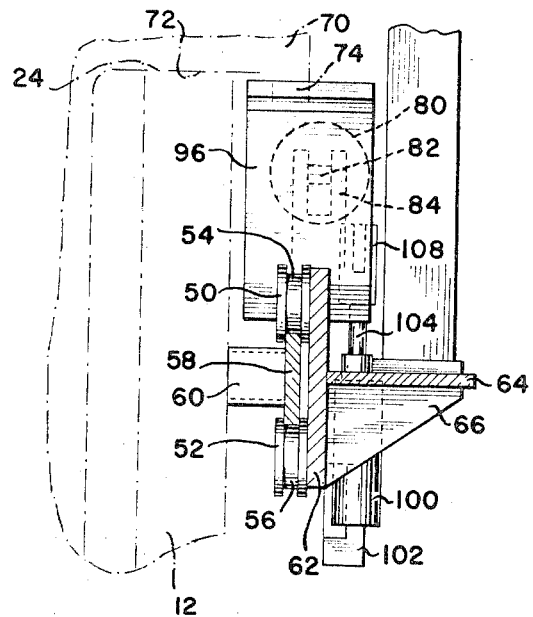
FIG. 3 is an enlarged view showing a detail of the mounting of the plate shifter carriage on the filter press side rails.
Figure 4:
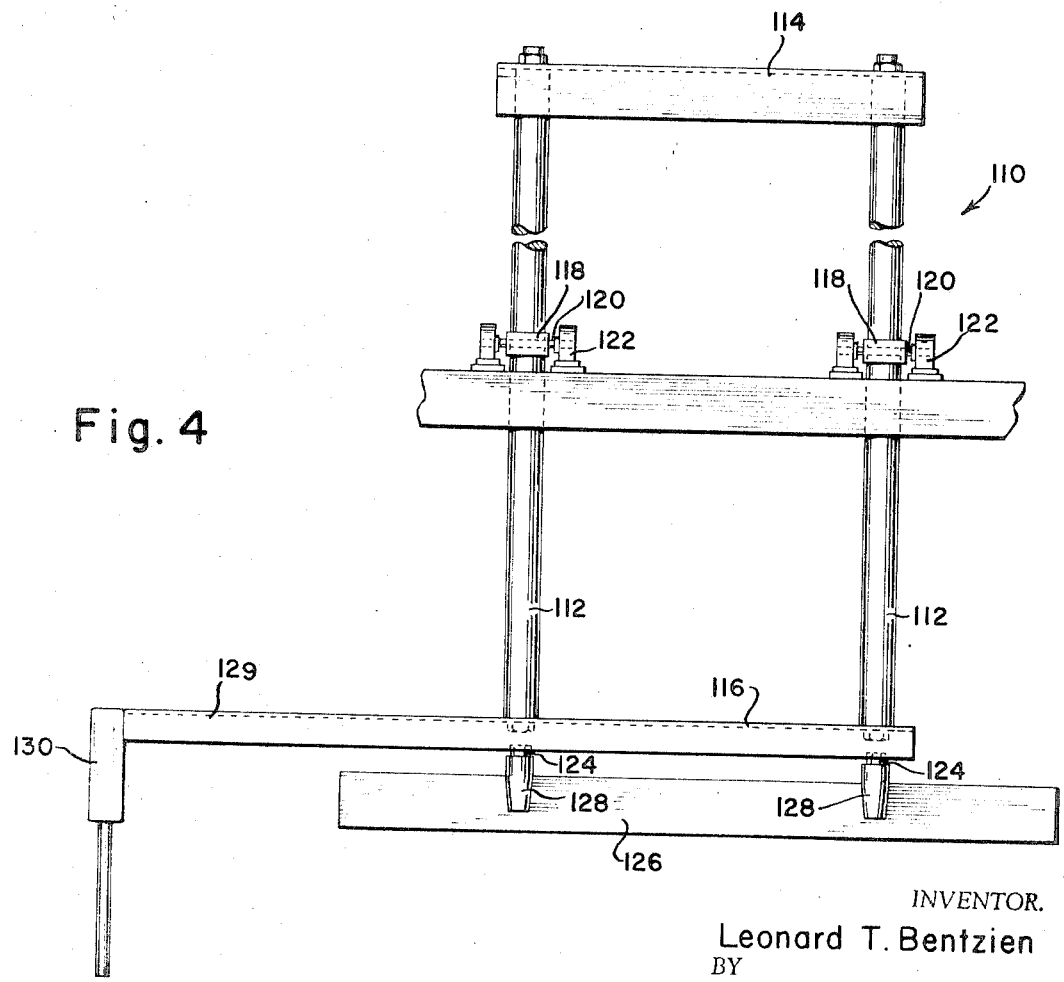
FIG. 4 is an elevational view showing the upper end of the plate shifter.

Each base support rail 34 (see FIG. 3 as well) is mounted for slidable disposition along the side rails 12 of the filter press and includes a plurality of upper and lower rolling bearing members 50 and 52, respectively, having hub portions 54 and 56, respectively, mounted for rolling contact along a guide track 58 which is fixed to an extending support 60 mounted on the side rails 12. The base support 34 includes a vertical plate member 62 and a horizontal plate member 64 which is fixed to, and supported on the vertical member 62 by a plurality of spaced support brackets 66. The rolling bearing members 50 and 52 are rotatably mounted on the vertical plate member 62 and the upstanding frame members 36 are carried by the horizontal support plate 64.

On each side of each filter plate 16 is an extending support bracket 70 having a lower portion 72 adapted to rest on the top 24 of a side rail 12 and permitting the plate 16 to slidably move along the rails 12. Each bracket 72 includes an extending tab portion 74 and it is these tabs which are operatively engaged by the plate shifting mechanism of the present invention, as will be explained more fully hereinbelow.

The shifting of the filter plates 16 is accomplished by a pair of oppositely disposed air cylinders 80, although any other mechanical or electrically operated device may also be used, which are pivotally mounted on plate member 64, for example by a pivoting connection 82 in upstanding cylinder support member 84 fixed to the support plate 64. Secured to the forward end of air cylinder 80 by nut 86 is a filter plate restraining plate 88 which has an L-shaped bracket 90 fixed to its upper portion adapted to engage the extending tab 74 on filter plate support bracket 70. A plate 96 is fixed to the plunger rod 92 of air cylinder 80, for example by a threaded nut 94 welded to plate 96, and plate 96 is also adapted to engage the extending tab 74 of the filter plate support bracket 70. Thus, when air cylinder 80 is actuated, rod 92 which is connected to the air cylinder piston is extended and plate 96 extends to move the filter plate 16 with which the plate 96 is in contact along rails 12.

The filter plate engaging plates 88 and 96 are selectively moved into and out of contact with a particular filter plate 16 by means of an air cylinder 100 mounted on a bracket mounting 102 on the underside of the support plate 64. Cylinder 100 extends through an aperture 106 in plate 64 and has affixed to its upper end a support member 108 which is in turn secured to the forward end of air cylinder 80. Since air cylinder 80 is pivotally supported at its rear end by support 84, actuation of air cylinder 100 causes the forward end of air cylinder 80, and the associated bracket plates 88 and 96, to move from a first position below the level of the extending tabs 74 to a second raised position wherein the plates 88 and 96 are in contact with, and engage, the tabs 74. Thus, when it is desired to shift plates 16 relative to each other to open the filter press and allow the accumulated filter cake to be scraped from the face of each plate, the pressing force from closing device 26 is removed, the plate shifting carriage 32 is rolled along side rails 12 to the plates to be shifted, and cylinder 100 is actuated elevating the forward end of air cylinder 80 to bring the separator plates 88 and 96 into contact with the extending tabs 74 of the filter plate 16. For the first shifting operation, plates 96 will be brought into contact with the follower 20 and plates 88 into contact with the first filter plate 16 adjacent thereto. Cylinder 80 is then actuated extending the plunger rod 92, and plate 96 in contact with the follower 20 pushes the follower along side rails 12 to create a separation between follower 20 and first filter plate 16. The separation between the follower 20 and the first filter plate thereby exposes the filter cake on the first plate 16 so it can be removed. The procedure is repeated to move the remaining filter plates 16 serially toward the follower 20 to allow the filter cake between each adjacent filter plate 16 to be scraped therefrom.

Associated with the plate shifting carriage is a filter plate scraping assembly 110, which is mounted pendulum fashion at the upper ends of the carriage 32. Plate scraping mechanism 110 includes a pair of pneumatically actuated cylinders 112 connected at their upper ends by a cross brace member 114 and at their lower ends by a cross brace member 116 and pivotally mounted at their approximate midpoint to carriage 32, for example by trunnions 118 rigidly secured to the exterior of cylinders 112 having extensions 120 rotatably mounted in pillow blocks 122 so that the whole scraper assembly 110 can pivot about its mounting.

Each of the air cylinders 112 has associated therewith an internal piston (not shown) connected to an external rod 120 to which is secured a scraper blade 126 by means of a bifurcated clamp 128 secured to the end of rod 124. Lower cross brace member 116 includes an extension 120 to which is secured a handle 130 for the operator and includes thereon suitable controls (not shown) to actuate the air cylinders 112 and extend scraper blade 126. Since the scraper assembly 112 is pivotally mounted, the operator by grasping handle 130 can pivot the lower end of the scraper assembly so that scraper blade 126 is adjacent to the filter plate 16 which is to be scraped and, by actuating the control mechanism extend the scraper blade so that it moves downwardly adjacent the face of the filter plate thereby scraping accumulated filter cake on the filter element 31 into a receiving through (not shown) below the filter press.

Air to actuate the air cylinders 80, 100 and 112 is supplied through a pneumatic supply system 132 which includes suitable pressure gauges 134, valves, branched connectors and controls to supply air under pressure to the air cylinders when it is desired to actuate them.

It is thus seen that a combined filter plate shifter and scraper assembly is provided which is readily adaptable to plate-type filter presses of standard construction and which is simple and efficient to operate and allows the shifting of filter plates in the filter press and the scraping of the accumulated cake thereon.

What is claimed is:

1. A pressure-type filter press in combination with a filter plate shifter and scraper assembly comprising a filter press having opposed parallel side rails, a plurality of filter plate members slidably disposed on said side rails, a plate shifter and scraper assembly slidably disposed relative to said filter press including a carriage slidably mounted on said side rails, means carried by said carriage to engage successive ones of a plurality of filter plate members slidably disposed on said filter press side rails including means to engage and to hold one of said successive filter plates stationery while moving the other of said filter plates relative thereto to thereby separate said plates and scraper means on said assembly selectively operable to extend between said separated plates and scrape the exposed faces of said plates.

2. Apparatus as described in claim 1 wherein said means to engage and to hold one of said successive filter plates comprises opposed air cylinders mounted on said carriage, a first plate fixed to one end of said cylinder adapted to engage a portion of a first filter plate, a second plate fixed to an extension of the piston element of said air cylinder and adapted to engage a portion of a second filter plate, whereby when said air cylinder is actuated, said second plate moves away from said first plate, thereby moving said second filter plate away from said first plate.

3. Apparatus as described in claim 2 wherein said engaging and holding means are pivotally mounted on said carriage and include means to selectively pivot said first and second plates into and out of contact with said filter plates.

4. Apparatus as described in claim 3 wherein said means to selectively pivot said engaging and holding means comprises an air cylinder mounted on said carriage and having a plunger connected at one end to the air cylinder piston and at its other end to said engaging and holding means whereby when said air cylinder is actuated to extend said plunger, said first and second plates are moved from a first position out of contact with said filter plate to a second position in contact with selected ones of said filter plates.

5. Apparatus as defined in claim 1 wherein said scraper means includes at least one air cylinder pivotally mounted to said assembly and a scraper blade connected to an extension of said air cylinder plunger whereby when said air cylinder is actuated said scraper blade is extended.

6. A plate shifter and scraper assembly for a pressure-type filter press comprising a carriage adapted to move longitudinally of the filter press frame, means carried by said carriage to engage successive ones of a plurality of filter plate members slidably disposed on said filter press frame including means to engage and hold one of said successive filter plates stationary while moving the other of said successive filter plates relative thereto, and means associated with said carriage adapted to operatively engage the exposed faces of said successive ones of said filter plates to scrape off filter cake accumulated thereon.

7. Apparatus as defined in claim 6 wherein said means to engage and hold said filter plates comprises an air cylinder pivotally mounted to said carriage, a filter plate restraining bracket fixed to the piston end of said cylinder, a filter plate shifting bracket fixed to an extension of the air cylinder plunger whereby when said brackets are in contact with successive ones of said filter plates and said air cylinder is actuated thereby to move said brackets apart, said filter plate in contact with said shifting bracket is moved relative to the filter plate in contact with said restraining bracket.

8. Apparatus as defined in claim 7 including means to move said filter plate shifting and restraining brackets into contact with said successive ones of said filter plate.

9. Apparatus as defined in claim 8 wherein said means to move said brackets comprises a second air cylinder disposed laterally to said first mentioned air cylinder having an extension of its piston fixed to said first air cylinder whereby when said second air cylinder piston is extended, said first cylinder is pivoted about its mounting thereby to place said brackets into contact with said filter plates.

10. Apparatus as described in claim 6 wherein said means to scrape said filter plates comprises a selectively extensible scraper blade pivotally mounted on said carriage so as to move into contact with the opposed faces of said successive ones of said filter plates whereby when said blade is extended it moves along the face of one of said successive filter plates to scrape accumulated filter cake off.

11. Apparatus as described in claim 10 wherein said scraper blade is connected to an extension of an air cylinder plunger and said air cylinder is pivotally mounted on said carriage whereby said scraper blade may be selectively pivotally moved into contact with opposed faces of said successive ones of said filter plates.

* * * * *